Oct. 28, 1930.  O. N. BRYANT  1,779,419
GOVERNING SYSTEM
Filed May 21, 1928  3 Sheets-Sheet 2

WITNESS
E. Lutz

INVENTOR
O.N. Bryant
BY
a. B. Reavis
ATTORNEY

Patented Oct. 28, 1930

1,779,419

UNITED STATES PATENT OFFICE

OZRO N. BRYANT, OF MOORES, PENNSYLVANIA, ASSIGNOR TO WESTINGHOUSE ELECTRIC & MANUFACTURING COMPANY, A CORPORATION OF PENNSYLVANIA

GOVERNING SYSTEM

Application filed May 21, 1928. Serial No. 279,452.

My invention relates to a governing or control system, more particularly to the governing system for a bleeder or mixed pressure turbine driving an electrical generator which feeds into a common electrical transmission line, and it has for its object to provide apparatus of the character designated whereby improved governing may be obtained.

A further object is to provide a governing system, for a prime mover driving an electrical generator, which is responsive to the electrical load on or carried by said generator.

Another object is to provide a governing system for a turbine, whereby the generator driven thereby will carry a proportionate share of the load on an electrical transmission line to which it delivers electrical power.

It is a particular object of my invention to provide a governing system for an extraction or bleeder turbine driving an electrical generator, which will govern the turbine in accordance with the load carried by the generator, so that the latter may be independent of the bleeder demand.

Governing or control systems for bleeder turbines have heretofore been used wherein the governor controlling the admission valve is compensated upon changes in bleeder demand. While certain of said systems have been very satisfactory, accurate compensation over a wide range of bleeder demand is sometimes difficult to obtain.

In accordance with my invention, I provide a governing system, which includes means responsive to the electrical load carried by the generator.

Specifically, I provide a governing system for a bleeder turbo-generator feeding into a common line, which includes a mechanism responsive to the proportionate share of the load on the line carried by the generator. The generator thus carries its electrical load without being substantially affected by the amount of bleeding from the turbine.

Apparatus exemplifying my invention is illustrated in the accompanying drawing, in which.

Figure 1:
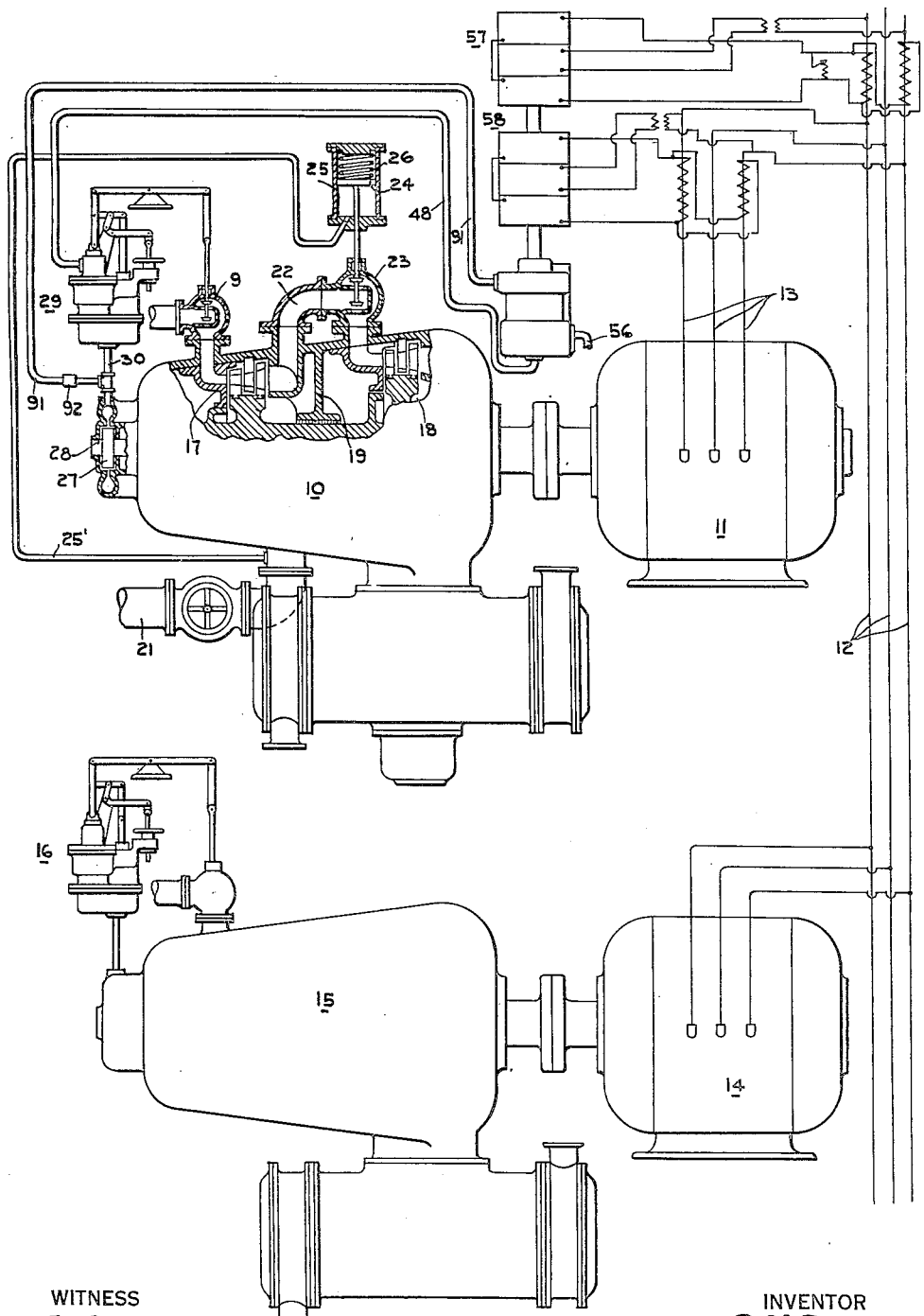
Fig. 1 is a diagrammatic view of a bleeder or mixed pressure turbo-generator having my governing system applied thereto.

Referring to the drawing more in detail, I show, in Fig. 1, a bleeder turbine 10 directly coupled to a generator 11. The generator 11 is connected to an electrical transmission line 12 by means of a connecting line 13, through which it delivers electrical power to the transmission line 12.

The line 12 is also fed by other generators, one of which, generator 14, is shown as driven by a non-bleeding condensing turbine 15. The turbine 15 may be controlled by a speed-responsive governor 16 of the fluid-pressure type in the usual manner. It will be apparent that any number of generators may deliver power to the line 12 and that such generators may be driven by any of numerous types of prime movers, the turbine 15 being illustrated merely as an example.

The bleeder turbine 10 has a high-pressure section 17 and a low-pressure section 18 separated by a diaphragm 19. An admission valve 9 controls the admission of steam to the high-pressure section 17, and communicating with the discharge end of said section is a conduit 21, through which steam may be extracted from the turbine for use in other apparatus. A conduit 22 provides a by-pass around the diaphragm 19 for that steam which continues its expansion in the low-pressure section 18.

A valve 23 is interposed in the conduit 22, and is controlled by a piston 24 in a cylinder 25. The piston is subjected to the pressure in the conduit 21, which is communicated to the lower end of the cylinder 25 through a conduit 25'. A spring 26 biases the piston in opposition to the fluid pressure.

The valve 23 regulates the flow of steam to the conduit 21 in accordance with the demand therefor by holding back sufficient steam from the low-pressure section 18 to maintain the desired bleeder pressure. Upon an increase in demand for bleeder steam, the pressure in the conduit 21 decreases, permitting the spring 26 to decrease the opening of the valve 23. A greater amount of steam is thus held back from the low-pressure section to supply the bleeder demand.

Upon a decrease in demand and increase in pressure, the piston 24 is moved against the force of the spring 26 to increase the opening of the valve 23 and the amount of steam going to the low-pressure section 18.

It will be readily apparent to those skilled in the art, that any suitable means may be used for regulating the quantity of steam extracted from the turbine, the particular means disclosed being merely by way of example.

The governing system, which controls the admission valve 9 of the bleeder turbine 10, includes an impeller 27 mounted directly on the shaft 28 of the turbine. The impeller develops a fluid pressure which varies as a function of the speed of the turbine, and which is conveyed through a conduit 30 to the lower end of the casing 32 of a governor 29, shown in detail in Fig. 2. This governor is described in greater detail in Patent No. 1,533,767, granted April 14, 1925, to H. F. Schmidt, and includes an operating piston 31 disposed in a cylinder 32' formed in the casing 32, and a pilot valve 33 disposed in the hollow interior of the operating piston 31. The pilot valve 33 is connected to the upper end of a tension spring 34, extending within the hollow interior of the pilot valve, the lower end of the spring being connected to a spring-holding member 35. The interior of the pilot valve contains fluid at the pressure developed by the impeller 27.

The operating piston 31 is formed with ports 36, providing communication between the upper side of the piston and a hollow interior, and with ports 37 providing communication between the lower side of the piston and the hollow interior. The pilot valve 33 is provided with a piston portion 38 which normally covers the ports 36 and also with ports 39 disposed immediately above the piston portion 38. The pilot valve is further provided with a recessed portion 41 below the piston portion 38.

The pilot valve 33 controls the movement of the operating piston 31 in the following manner: Upon downward movement of the pilot valve 33, fluid pressure is admitted from the interior of the pilot valve through the ports 39 and 36 to the upper side of the piston 31, upon which it acts to lower the piston until the ports 36 are again covered by the piston portion 38. Upon upward movement of the pilot valve, the ports 36 and 37 are placed in communication by the recessed portion 41, and the fluid pressure in the lower end of the governor casing 32 acts on the lower end of the tubular extension 42 of the operating piston 31 to raise the operating piston until the ports 36 are again covered by the piston portion 38. Upon movement of the operating piston, the spring-holding member 35 is moved in the same direction a proportionately lesser distance through the linkage mechanism 43, which includes the levers 71 and 72 and the link 73, for the purpose of obtaining increased movement of the operating piston for a given change in speed, as is more fully explained in the above-mentioned patent.

The pilot valve 33 is provided with a restricted orifice 44, through which a restricted flow of fluid passes to a chamber 45 above the pilot valve formed by the hollow interior of the operating piston 31. The governor casing 32 is provided with a chamber 46, to which the pressure from the chamber 45 is communicated by means of openings 47 in the operating piston 31.

The chamber 46 communicates through a conduit 48 with a back-pressure or relief valve 49, disposed in a casing 51. The valve 49 is biased to closed position by a spring 52, held at its other end by a piston 53 which is slidable in the cylindrical interior of the casing 51. A stem 54 extends through the casing 51 and through a central opening in the piston 53, and is adapted to control the position of the latter. For this purpose a restricted flow of fluid under pressure is admitted to the casing 51 above the piston 53, which may be supplied from the impeller 27 through the conduit 30 and a conduit 91 having a restricted orifice 92. The stem 54 has a passage 55 therein, which extends to the lower end thereof and which is adapted to provide communication between the upper and lower sides of the piston 53.

When the piston 53 covers the upper end of the passage 55, the restricted flow of fluid lowers the piston 53, until the upper end of the passage 55 is sufficiently uncovered to permit the incoming flow of fluid to escape therethrough, to the lower side of the piston 53 and out through the discharge conduit 56. Upon upward movement of the stem 54, the fluid above the piston 53 is released through the passage 55 and the spring 52 moves the piston 53 upwardly until the passage 55 is uncovered only sufficiently to permit the escape of as much fluid as is admitted.

It will be apparent, therefore, that the piston 53 follows the movements of the stem 54, and that the piston 53 is held by a substantial force while the stem 54 is not required to exert any substantial force to accomplish this result. The position of the piston 53 determines the compression and force of the spring 52, and therefore varies the back pressure which the valve 49 imposes upon the fluid flowing therethrough, and which is the pressure of the fluid in the chamber 45.

The stem 54 is controlled by a mechanism which is responsive to the load carried by the transmission line 12, and to the load carried by the generator 11, and therefore is responsive to the ratio of the load which the generator 11 carries to the load on the line 12.

This mechanism includes a watt-meter device 57, which is responsive to the load carried by the line 12, and a watt-meter device 58, which is responsive to the load delivered by the generator 11 over the connecting line 13. The watt meter devices may be of any suitable construction known to the art. They are here shown as each including a solenoid 59, consisting of current coils 61 and 62 and a voltage coil 63 disposed intermediate the current coils. An iron core 64 is disposed within the solenoid of the watt-meter 57, and is connected by a brass rod 65 to a core 66 disposed in the solenoid of the watt-meter 58.

Each core is biased by its solenoid to a mid position therein, said bias increasing for a certain distance as the core moves outwardly. The cores are attached to the brass rod 65 so the distance between their centers is greater than the distance between the centers of the solenoids. Hence, the core 64 is disposed above mid position and biased downwardly, and the core 66 is disposed below mid position and biased upwardly.

A rheostat 67 is shunted across the leads running to the current coils of the watt-meter 57, by means of which the force exerted by the watt-meter device 57 in relation to the load on the line 12 may be increased or decreased, to equal the force exerted by the watt-meter device 58 when the desired ratio exists between the load carried on the line and the load carried by the generator 11.

The operation of the above embodiment of my invention is as follows:

Assume the entire apparatus to be in normal operation, the generator 11 carrying its proportionate share of the load on the line 12, and the turbine 10 bleeding a normal quantity of steam. All the units are maintained at the same speed or substantially so through the electrical connections of the generators.

Upon an increase in load on the system, the speed of all the units decreases. The decreased pressure developed by the impeller 27 permits the spring 34 of the governor 29 to lower the pilot valve 33, whereupon the piston 31 moves the admission valve 9 to increase its opening, thereby admitting additional motive fluid to the turbine 10 to carry its share of the increased load. The increased admission increases the pressure in the conduit 21, whereupon the valve 23 opens to admit the additional motive fluid to the low pressure section.

During the change in load just described, the units increase their load together, hence the forces exerted by the watt-meter devices 57 and 58 increase equally and the stem 54 remains stationary.

A decrease in load results in increased speed and decreased admission of motive fluid by the reverse operation.

Assume now that the demand upon the turbine 10 for bleeder steam increases. The pressure in the conduit 21 drops and the valve 23 decreases its opening to divert additional steam from its passage through the turbine. The loss of steam in the low pressure section 18 decreases the power out-put of the turbo-generator.

The watt meter device 58 responds by decreasing the upward pull on the core 66, and the stem 54 moves downwardly, under force of the device 57. The force of the device 57 decreases as the core 64 moves downwardly and that of the device 58 on the core 66 increases, until the forces of the watt meter devices are again equalized.

The downward movement of the piston 53, in following the stem 54, increases the compression of the spring 52 and the back pressure in the chamber 45 of the governor 29. The increased back pressure on the pilot valve 33, together with the force of the spring 34, overcomes the impeller pressure below the pilot valve and moves the same downwardly. The piston 31 follows and moves the valve 9 to increased opening, thereby supplying the additional motive fluid needed for the turbo-generator 10—11 to carry its share of the electrical load. The valve 23 is operated, as before, to provide the desired bleeder pressure, permitting the remaining steam to pass to the low pressure section 18.

Upon a decrease in bleeder demand, the pressure increases and the valve 23 is opened to pass additional steam to the low pressure section, whereupon the turbo-generator assumes a greater share of the load.

The watt meter device 58 increases its pull on the core 66 moving it upwardly until the forces on the two cores are again balanced. The upward movement of the stem 54 decreases the compression of the spring 52 and the back pressure in the chamber 45. The pilot valve 33 moves upwardly and the piston 31 follows, closing the valve 9 and decreasing the fluid admission to the turbine 10 until it again carries only its share of the power load.

The portion of the load which the turbo-generator 10—11 carries may be changed by adjusting the rheostat 67. To increase its portion, the resistance of the rheostat is increased, thereby shunting a lesser portion of the current in the watt meter device 57 and increasing the downward pull on the core 64. The stem 54 is, therefore, lowered and the fluid admission to the turbine 10 is increased.

In the illustrated embodiment of my invention, there will be some variation in the share of the load which is taken by the turbo-generator provided with my novel governing system. A small range of variation is used to operate the watt meter devices and vary the admission of motive fluid.

It will be apparent that, instead of extracting steam through the conduit 21, available low pressure steam may be inducted into the turbine through said conduit. The governing system for the admission valve 9 will operate in the same way to supply sufficient high pressure steam to carry the desired portion of the electrical load.

While I have shown but one extraction conduit communicating with the turbine casing, it will be apparent that any number of extraction conduits may be provided without modifying the action of the governing system just described.

Figure 3:
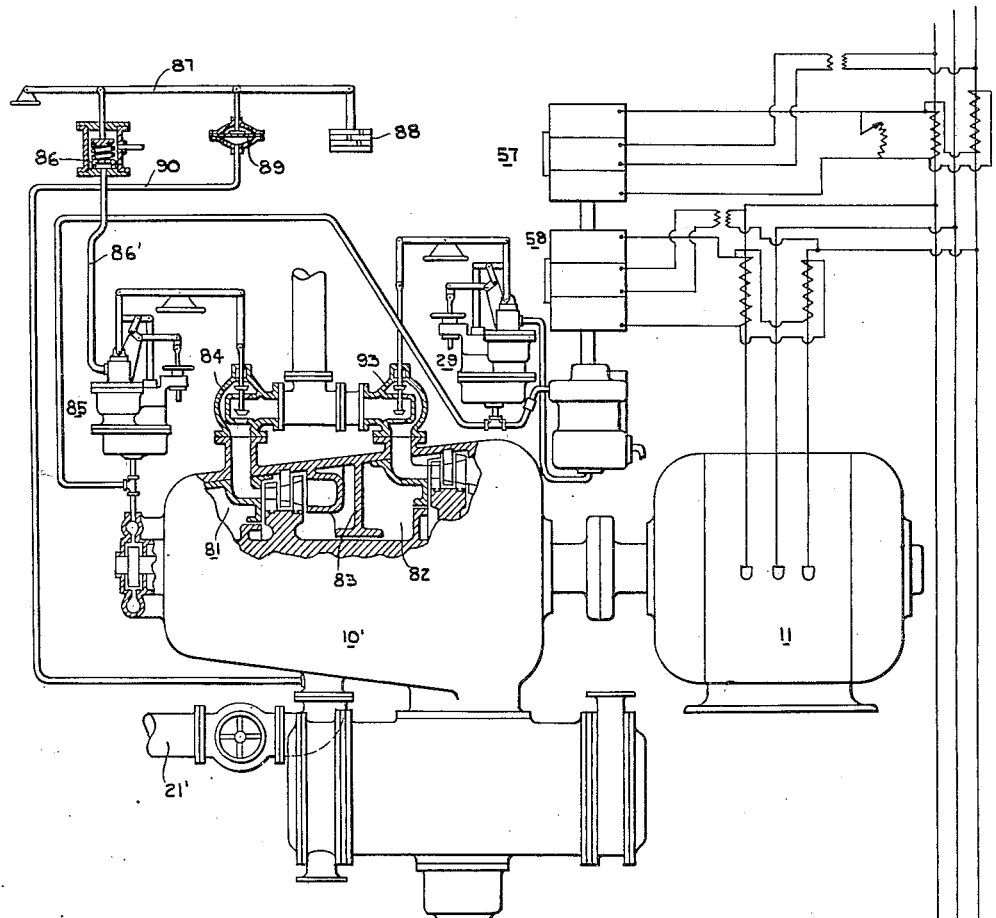
Fig. 3 shows my invention applied to another type of turbine.

In Fig. 3 I show a modified form of extraction turbine 10' having my novel governing system applied thereto. This turbine comprises two non-communicating sections 81 and 82, separated by a partition 83, which may receive motive fluid from the same source, and independently of each other.

The section 81 is a non-condensing section discharging to a conduit 21'. The admission of steam to this section is regulated to supply the required amount of partially expanded steam to the conduit 21'.

Figure 2:
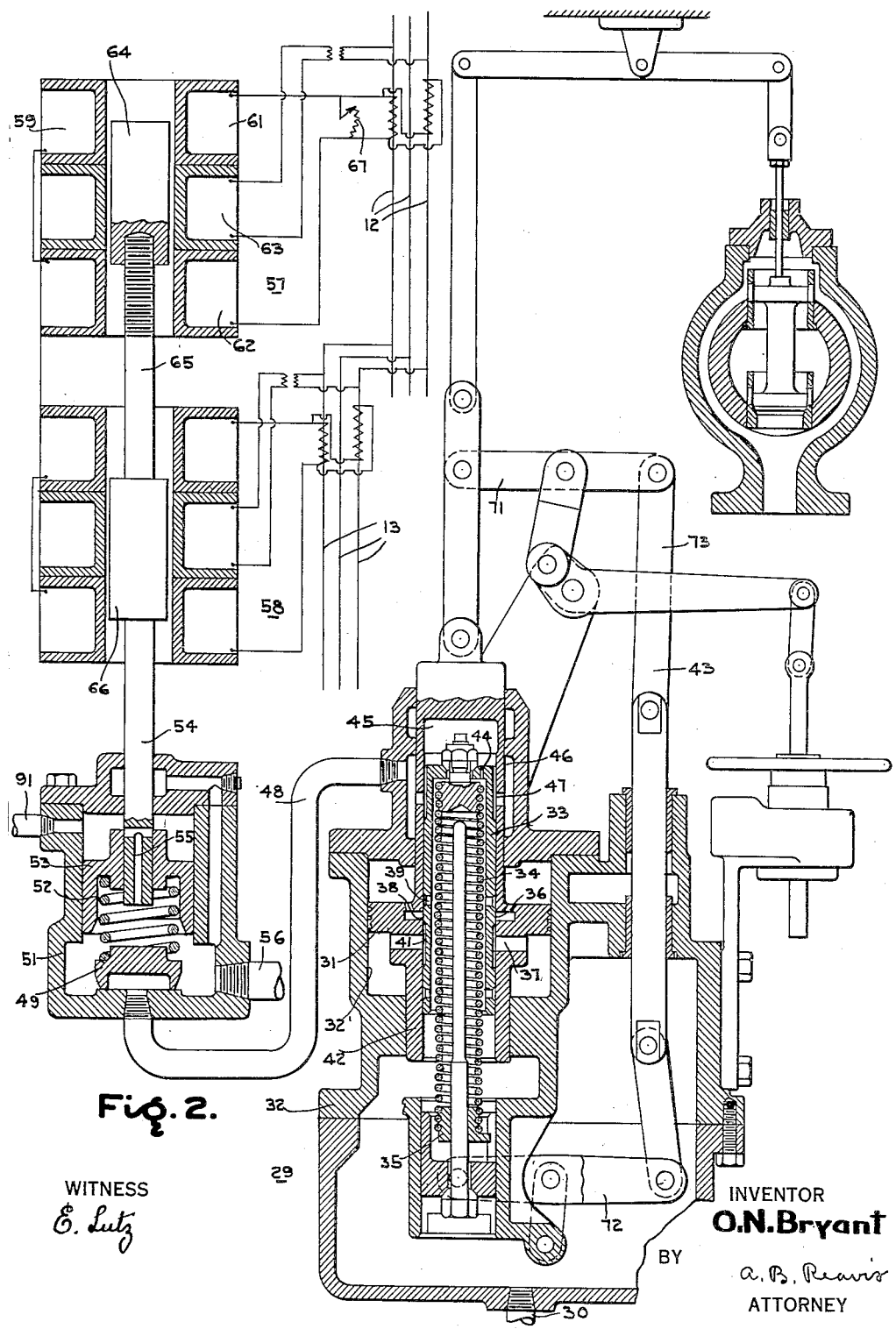
Fig. 2 shows said governing system in further detail.

High pressure steam is admitted to the section 81 through the admission valve 84, which is operated by a governor 85, similar to the governor 29 shown in Fig. 2. The back pressure in the chamber 45 of the governor 85 is controlled by a back pressure valve 86 communicating therewith through a conduit 86', and which, in turn, is controlled by a lever 87. The lever 87 is biased downwardly by weights 88 and upwardly by the pressure imposed on a diaphragm 89 connected to the lever. The pressure in the conduit 21' is communicated to the diaphragm 89 through a conduit 90.

Upon an increase in demand for steam in the conduit 21', the pressure therein decreases, permitting the weights 88 to impose a greater force on the back pressure valve 86 to increase the back pressure on the governor 85. The governor thereupon moves the valve 84 in opening direction to supply an increased amount of steam to the conduit 21'.

When the demand for steam in the conduit 21' decreases and the pressure increases, the latter acts on the diaphragm 89 against the force of the weights 88 to decrease the back pressure which the valve 86 imposes on the governor. The governor then moves the valve 84 in closing direction to decrease the supply of steam.

The power developed by the section is thus dependent upon the demand for low pressure steam, the energy of the steam in expanding from boiler pressure to that required in the conduit 21' being utilized to the extent to which it is available.

The section 82 is a condensing section and supplies the remainder of the power required to carry the electrical load in the generator. The admission of steam to the section 82 is controlled by an admission valve 93 which is shown as operated by a governor 29, identical with that shown in Fig. 1. A governing system, also identical with that shown in Fig. 1, is provided, which controls the back pressure in the pilot valve in the governor, and thus varies the admission of steam to the condensing section so that the generator carries its share of the electrical load.

From the above description, it will be apparent that I have provided a novel system of governing which is particularly useful in connection with extraction or mixed pressure turbines, although it will be equally apparent that the invention is not so limited. The governing system may be used on any prime mover or other machine. Also, either watt meter device may be disconnected and the other used alone. When the watt meter 58 is thus used, the generator will carry a given load. When the device 57 is used alone, the generator will take the variations in load on the line and permit the other generators on the line to run on base load.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a common power transmission means and a plurality of prime movers delivering power thereto, of means responsive to the ratio of power transmitted over said common power transmission means to the power delivered thereto by one prime mover for governing said prime mover.

2. The combination with a common power transmission means and a plurality of prime movers delivering power thereto, one of said prime movers being an elastic fluid turbine having means for extracting partially expanded motive fluid therefrom, of means responsive to the ratio of power transmitted over said common power transmission means to the power delivered thereto by said one prime mover for governing the latter.

3. The combination with a turbo-generator and an electrical transmission line to which said turbo-generator delivers electrical power, of means for governing said turbo-generator, said means including a watt meter device responsive to power transmitted over said line and a watt meter device responsive to power delivered by said turbo-generator.

4. The combination with a prime mover, an electrical generator and an electrical power transmission line into which the generator feeds, of means responsive to the ratio of load carried by said generator to power transmitted over said line for governing said prime mover.

5. The combination with a plurality of turbo-generators and common electrical transmission means to which said generators deliver electrical power, of means responsive to the ratio of power transmitted by said transmission means to the power delivered by one turbo-generator for governing said turbo-generator.

6. The combination with a turbo-generator and an electrical transmission line into which the generator feeds, said turbine having conduit means communicating therewith intermediate operative stages, of means for controlling the admission of motive fluid to said turbine in response to the proportionate share of the load on said line carried by said generator, whereby the load carried by the generator will be substantially unaffected by the amount of fluid flowing through said conduit means.

7. The combination of an electrical transmission line, a plurality of generators delivering electrical current to said line, elastic fluid prime mover apparatus for driving one of said generators, an admission valve for said prime mover apparatus, means for extracting partially expanded motive fluid from said prime mover apparatus, and means responsive to the electrical load on the transmission line for controlling said admission valve.

8. The combination of an electrical transmission line, a plurality of generators delivering electrical current to said line, elastic fluid prime mover apparatus for driving one of said generators, an admission valve for said prime mover apparatus, means for extracting partially expanded motive fluid from said prime mover apparatus, and means responsive to the electrical load on the transmission line and to the load on the generator for controlling said admission valve.

9. The combination of an electrical transmission line, a plurality of generators delivering electrical current to said line, elastic fluid prime mover apparatus for driving one of said generators, an admission valve for said prime mover apparatus, means for extracting partially expanded motive fluid from said prime mover apparatus, and means responsive to the ratio of the electrical load carried by the generator to the electrical load on said line for controlling said admission valve.

10. The combination with a bleeder turbo-generator and an electrical transmission line into which said generator feeds, of means for controlling the bleeding of steam in response to demand therefor, and means for controlling the admission of motive fluid to the turbine in response to the proportionate share of the load on said line carried by said generator.

11. The combination with a turbo-generator and an electrical transmission line into which the generator feeds, of means producing a fluid pressure varying as a function of the ratio of load on said line to load carried by said generator, and means responsive to said fluid pressure for governing the admission of motive fluid to the turbine.

12. The combination with an electrical generator, an electrical transmission line into which said generator delivers electrical current, and prime mover apparatus for driving said generator, said prime mover having an admission valve, of a governing mechanism for said admission valve comprising a watt meter device responsive to the current transmitted by said line, a watt meter device responsive to the current delivered by said generator, means connected with both of said watt meter devices for providing a variable fluid pressure, and means responsive to said variable fluid pressure for governing said admission valve.

13. The combination with a turbo-generator and an electrical transmission line into which the generator feeds, of means producing a fluid pressure varying as a function of the ratio of load on said line to load carried by said generator, means developing a fluid pressure varying as a function of the speed of the turbine, and means responsive to both of said fluid pressures for governing the admission of motive fluid to the turbine.

14. The combination with a prime mover, an electrical generator driven thereby and an electrical transmission line to which said generator delivers electrical power, of a governing system for said prime mover comprising a control member, a watt meter device biasing said member in one direction in response to the load carried on said line, a second watt meter device biasing said control member in the opposite direction in response to the load carried by said generator, and means controlled by said control member for varying the admission of fluid to said prime mover.

15. The combination with a prime mover, an electrical generator driven thereby and an electrical transmission line to which said generator delivers electrical power, of a governing system for said prime mover comprising a control member, a watt meter device biasing said member in one direction in response to the load carried on said line, a second watt meter device biasing said control member in the opposite direction in response to the load carried by said generator, means controlled by said control member for providing a variable fluid pressure, and means responsive to said variable fluid pressure for governing said prime mover.

16. The combination with an electrical transmission line, an electrical generator delivering electrical current to said line and a prime mover for driving said generator, of an admission valve for the prime mover, and means responsive to the electrical load on the transmission line and to the load on the generator for controlling said admission valve.

17. The combination with an electrical transmission line, an electrical generator delivering electrical current to said line and a prime mover for driving said generator, of an admission valve for the prime mover, governing means responsive to the speed of the prime mover for controlling said admission valve, and means responsive to the electrical load on the transmission line and to the load on the generator for modifying the action of said speed responsive governing means.

In testimony whereof, I have hereunto subscribed my name this 11th day of May, 1928.

OZRO N. BRYANT.